D. T. MILLING & D. D. JONES.
CHURN.
No. 184,886. Patented Nov. 28, 1876.
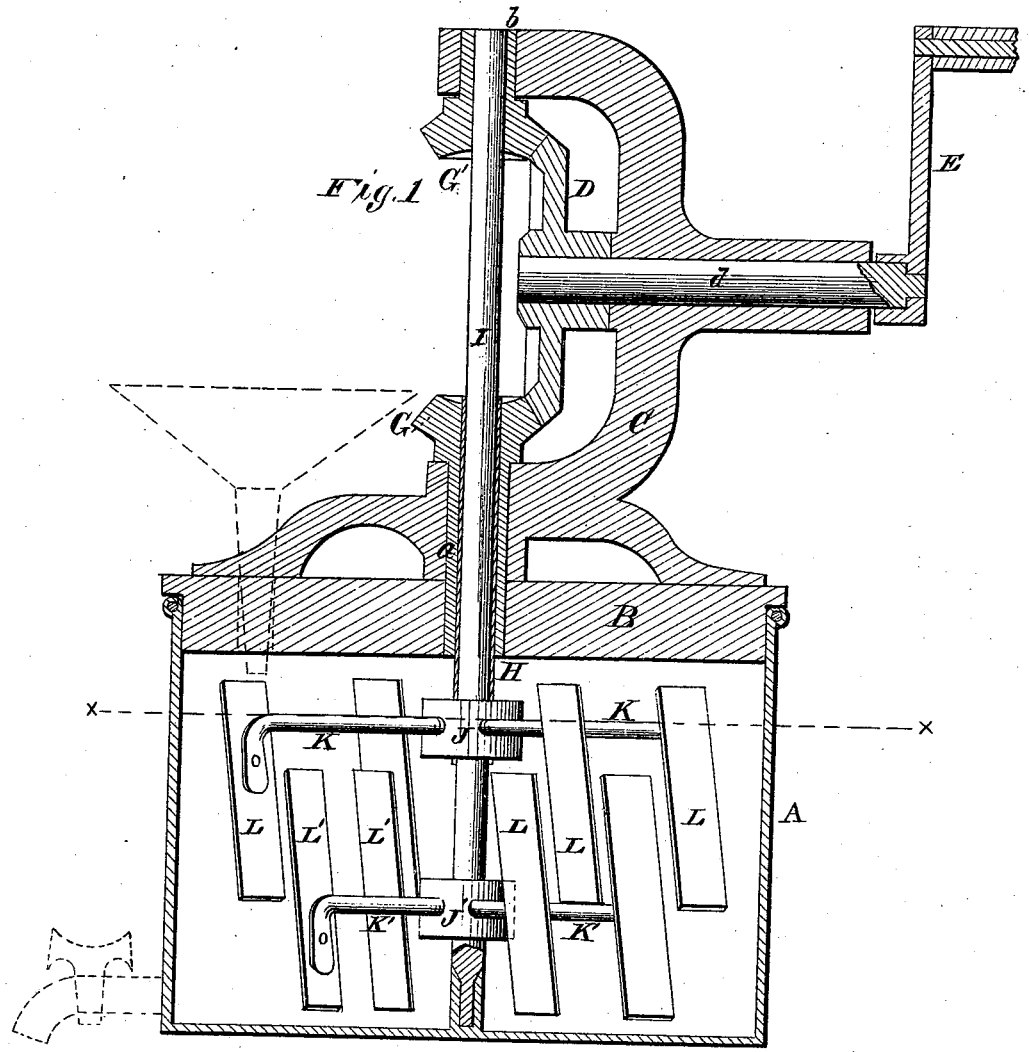
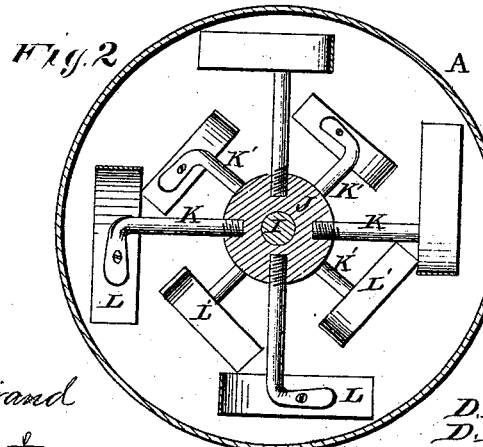

UNITED STATES PATENT OFFICE.

DAVID T. MILLING AND DAVID D. JONES, OF CHATTANOOGA, TENN.

IMPROVEMENT IN CHURNS.

Specification forming part of Letters Patent No. 184,886, dated November 28, 1876; application filed September 23, 1876.

*To all whom it may concern:*

Be it known that we, DAVID T. MILLING and DAVID D. JONES, of Chattanooga, in the county of Hamilton, and in the State of Tennessee, have invented certain new and useful Improvements in a Churn and Ice-Cream Freezer Combined; and do hereby declare that the following is a full, clear, and exact description thereof, reference being had to the accompanying drawings, and to the letters of reference marked thereon, making a part of this specification.

The nature of our invention consists in the construction and arrangement of a combined churn and ice-cream freezer, as will be hereinafter more fully set forth.

In order to enable others skilled in the art to which our invention appertains to make and use the same, we will now proceed to describe its construction and operation, referring to the annexed drawing, in which—

Figure 1 is a vertical section of our machine; and Fig. 2 is a horizontal section of the same through the line x x, Fig. 1.

A represents the churn provided with a rabbeted lid, B, fitting snugly therein. On top of the lid B is secured a metallic frame, C, of substantially the construction as shown in Fig. 1. In this frame is a horizontal shaft, d, having a crank, E, on its outer end, and a beveled cog-wheel, D, on its inner end. The beveled cog-wheel D gears with two beveled pinions, G and G'. The pinion G is formed with an elongated hub, a, which extends downward through the lower part of the frame C, and through the lid B, and is fastened to a sleeve or tube, H, passing through it and extending a suitable distance below the lid. Through the sleeve or tube H passes a shaft, I, on the upper end of which the pinion G' is secured, said pinion being formed with an extended hub, b, projecting into the upper portion of the frame C. The lower end of the shaft I is formed with a point or tenon, i, that rests in a step, h, in the center of the bottom of the churn. By rotating the shaft d, by means of its crank E, the wheel D is revolved, whereby the two pinions G G' are revolved in opposite directions, and these pinions being respectively secured to the sleeve H and shaft I, said sleeve and shaft are therefore also rotated in opposite directions. On the lower end of the sleeve or tube H, within the churn, is secured a hub or collar, J, and in this hub are screwed a series of radial arms, K K, the outer ends of which are turned downward and have the paddles L attached to them. On the shaft I, below the sleeve H, is secured a similar hub or collar, J', with screw-arms K', having paddles L', but these latter arms K' are shorter than the arms K, so that the paddles L' will be located within the circle described by the paddles L. The two sets of paddles revolve in opposite directions, thus producing a thorough and perfect agitation of the milk, and by means of their respective screw-arms they can be adjusted or set at any desired angle, which is of great importance, as thereby the commotion or agitation of the milk can be regulated at will.

The lid B should be provided with a funnel for the admission of the milk, and the churn A with a faucet to draw off the buttermilk, as represented by the dotted lines in Fig. 1.

This machine can be used both as a churn and as an ice-cream freezer, in which latter case the vessel A must be placed within a larger vessel and the space between the two packed with ice.

Having thus fully described our invention, what we claim as new, and desire to secure by Letters Patent, is—

In a churn having two sets or series of paddles revolving in opposite directions, the adjustable screw-arms K K', carrying the paddles L L', whereby said paddles may be set at any desired angle, as herein set forth.

In testimony that we claim the foregoing we have hereunto set our hands this 6th day of September, 1876.

D. T. MILLING.
D. D. JONES.

Witnesses:
E. M. DODSON,
MELVIN ADAMS.